United States Patent
Van Rijnswou

(10) Patent No.: US 8,023,645 B2
(45) Date of Patent: Sep. 20, 2011

(54) CIRCUIT ARRANGEMENT FOR AND METHOD OF PERFORMING AN INVERSION OPERATION IN A CRYPTOGRAPHIC CALCULATION

(75) Inventor: Sander Matthijs Van Rijnswou, Veldhoven (NL)

(73) Assignee: NXP B.V., Eindhoven (NL)

( * ) Notice: Subject to any disclaimer, the term of this patent is extended or adjusted under 35 U.S.C. 154(b) by 623 days.

(21) Appl. No.: 12/063,866

(22) PCT Filed: Aug. 9, 2006

(86) PCT No.: PCT/IB2006/052744
§ 371 (c)(1),
(2), (4) Date: Aug. 15, 2008

(87) PCT Pub. No.: WO2007/020566
PCT Pub. Date: Feb. 22, 2007

(65) Prior Publication Data
US 2009/0028325 A1    Jan. 29, 2009

(30) Foreign Application Priority Data
Aug. 19, 2005 (EP) .................................. 05107614

(51) Int. Cl.
*H04K 1/00* (2006.01)
*H04L 9/00* (2006.01)
(52) U.S. Cl. ......................................... 380/28; 380/259
(58) Field of Classification Search .................. 380/28, 380/259
See application file for complete search history.

(56) References Cited

U.S. PATENT DOCUMENTS

| | | | | |
|---|---|---|---|---|
| 4,471,164 | A * | 9/1984 | Henry | 380/30 |
| 4,870,681 | A | 9/1989 | Sedlak | |
| 4,935,962 | A * | 6/1990 | Austin | 713/159 |
| 5,289,542 | A * | 2/1994 | Kessler | 380/257 |
| 5,406,628 | A * | 4/1995 | Beller et al. | 380/30 |
| 5,724,425 | A * | 3/1998 | Chang et al. | 705/52 |
| 5,991,415 | A * | 11/1999 | Shamir | 380/30 |
| 6,411,715 | B1 * | 6/2002 | Liskov et al. | 380/277 |
| 6,609,141 | B1 | 8/2003 | Montague | |
| 6,666,381 | B1 * | 12/2003 | Kaminaga et al. | 235/492 |
| 6,724,893 | B1 * | 4/2004 | Petro | 380/286 |
| 7,149,311 | B2 * | 12/2006 | MacKenzie et al. | 380/286 |
| 7,191,333 | B1 * | 3/2007 | Maddury et al. | 713/174 |
| 2002/0188846 | A1 * | 12/2002 | Levy | 713/170 |
| 2003/0028771 | A1 * | 2/2003 | Kocher et al. | 713/172 |
| 2004/0030903 | A1 * | 2/2004 | Hicks et al. | 713/176 |

(Continued)

FOREIGN PATENT DOCUMENTS
EP    0566498 A2    10/1993
(Continued)

OTHER PUBLICATIONS

Chenghuai, Lu; et al "Implementation of Fast RSA Key Generation on Smart Cards" Proceedings. ACM Symposium on Applied Computing, SAC 2002, Madrid Spain, pp. 214-220 Downloaded From: http://portal.acm.org/citation.cfm?id=508791.508837.

(Continued)

*Primary Examiner* — Techane J Gergiso

(57) ABSTRACT

In order to further develop a circuit arrangement for as well as a method of performing an inversion operation in a cryptographic calculation, wherein only inversion modulo an odd number is allowed, it is proposed that the inversion operation is performed modulo at least one even number.

15 Claims, 1 Drawing Sheet

U.S. PATENT DOCUMENTS

Figure 1:
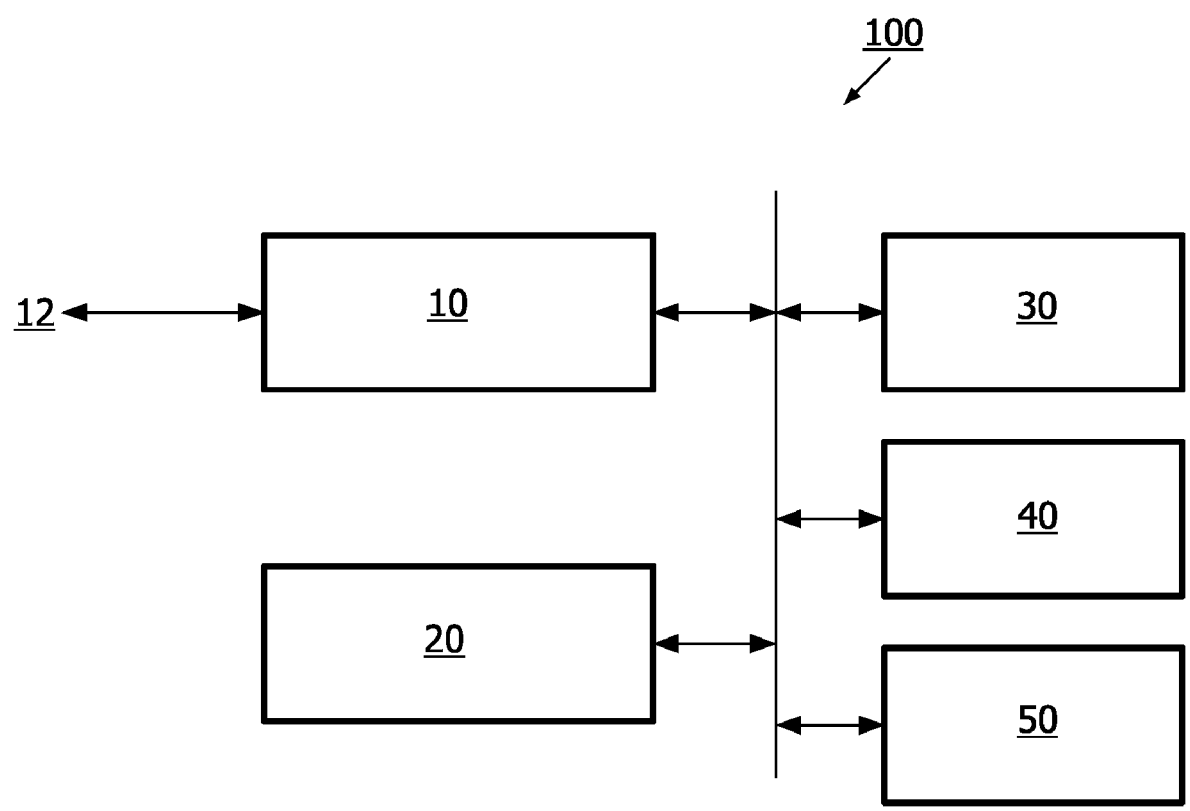

| | | | |
|---|---|---|---|
| 2004/0049526 A1* | 3/2004 | Joye et al. | 708/250 |
| 2004/0184604 A1* | 9/2004 | Joye et al. | 380/30 |
| 2006/0210066 A1* | 9/2006 | Villegas et al. | 380/28 |

FOREIGN PATENT DOCUMENTS

| | | |
|---|---|---|
| EP | 0577000 A1 | 1/1994 |
| WO | 0211360 A2 | 2/2002 |

OTHER PUBLICATIONS

Joye, M; et al "GCD-Free Algorithms for Computing Modular Inverses" Cryptographic Hardware and Embedded Systems. CHES 2003, International Workshop, Sep. 8, 2003, pp. 243-253.

* cited by examiner

CIRCUIT ARRANGEMENT FOR AND METHOD OF PERFORMING AN INVERSION OPERATION IN A CRYPTOGRAPHIC CALCULATION

The present invention relates to a circuit arrangement, in particular an integrated circuit, such as a mathematical coprocessor, for performing at least one inversion operation in at least one cryptographic calculation.

The present invention further relates to a method of performing at least one inversion operation in at least one cryptographic calculation.

E[lliptic]C[urve]C[ryptography] involves the use of calculations on an elliptic curve relationship over GF (p) or GF($2^n$). In this context, an architecture is said to be unified if this architecture is able to work with operands in both prime (p) extension fields and binary ($2^n$) extension fields:

If p is a prime, the integers modulo p form a field with p elements, denoted by GF(p). A finite field is a field with a finite field order, i.e. a finite number of elements, also called a G[alois]F[ield] or an GF. The order of a finite field is always a prime or a power of a prime. For each prime power, there exists exactly one (with the usual caveat that "exactly one" means "exactly one up to an isomorphism") finite field GF( ). GF(p) is called the prime field of order p, and is the field of residue classes modulo p.

When n>1, GF( ) can be represented as the field of equivalence classes of polynomials whose coefficients belong to GF(p). Any irreducible polynomial of degree n yields the same field up to an isomorphism.

E[lliptic]C[urve]C[ryptography] calculations further require the multiplication of long integers which are carried out repeatedly during the implementation of, for example, public key algorithms in cryptographic processors.

Typically, the multiplication operations must be carried out many hundreds of times to complete an encryption operation or a decryption operation, and so it is important that the cryptographic devices performing these operations execute the long multiplications quickly using a high speed multiplier.

E[lliptic]C[urve]C[ryptography] calculations require also an inversion calculation, i.e. the calculation of $Z^{-1}$, such that the product $Z \cdot Z^{-1} = 1 \mod N$. Every point addition calculation and every point doubling calculation requires such a calculation. The present algorithms are computationally intensive.

There are several cryptographic algorithms using arithmetical inversion using the Galois field GF(p). An example of such an algorithm is the E[lliptic]C[urve]D[igital]S[ignature]A[lgorithm] over GF(p). The ECDSA is the elliptic curve analogue of the D[igital]S[ignature]A[lgorithm] standard.

The advantages of ECDSA compared to R[ivest-]S[hamir-]A[dleman]-like schemes are shorter key lengths and faster signing and decryption. For example, a 160 (210) bit ECC key is expected to give the same security as a 1024 (2048) bit RSA key, and the advantage increases as the level of security is raised.

The ECDSA application only needs inversion modulo an odd number. This property makes it possible to use certain specialist inversion algorithms such as the Kaliski inversion. These inversion algorithms have the property that they are fast but they have the disadvantage that not all inputs can be handled.

This leads to the situation that in certain coprocessors only inversion can be done modulo an odd number. An example for such a coprocessor is the so-called "FrameXE" which is in wide spread use on many chip cards or smart cards and which is a cryptographic coprocessor specialized for calculating public-key algorithms such as RSA and ECC at very high speed; this coprocessor operates independently of the main C[entral]P[rocessing]U[nit] on the same smart card I[ntegrated]C[ircuit]; with fast execution, this coprocessor supports the trends to increased RSA key lengths and ECC based on GF(p) and GF($2^n$).

The fact that in certain coprocessors only inversion can be done modulo an odd number unfortunately implies that the hardware cannot (directly) be used for RSA key generation. It turns out that this potential application is at least as important as elliptic curves.

Regarding the technological background of the present invention, reference can be made to prior art document EP 0 577 000 A1 disclosing a method for performing public-key cryptography. In this context, the R[ivest-]S[hamir-]A[dleman] algorithm is a known public-key method and block cipher being based on the assumed difficulty of factoring large composite numbers using digital computation means.

The cipher keys are mathematically derived using two large prime numbers p and q; these prime numbers p and q must meet certain properties but a time consuming modular exponentiation is needed. According to prior art document EP 0 577 000 A1, the speed is improved by modifying the definition of the ciphertexts in such way that Montgomery-like multiplication resources and modified square-and-multiply procedures can be used.

Prior art document U.S. Pat. No. 4,870,681 refers to a cryptographic processor as well as to a cryptographic method for utilizing the RSA method (=public key code method of Rivest, Shamir, and Adleman) for enciphering and deciphering messages.

Prior art document WO 02/11360 A2 reveals a system and a method for storage and recovery of a private key in a cryptographic system by providing a parameterization of the private key using less storage space than the full C[ertificate]R[evocation]T[ree] parameter set and providing better computational efficiency than the minimal parameter set.

Also disclosed in prior art document WO 02/11360 A2 is a system and method for storage and recovery of a private key in a cryptographic system by providing a parameterization of the private key using less storage space than the full non-CRT parameter set and providing better computational efficiency than the minimal parameter set.

Prior art article "Implementation of Fast RSA Key Generation on Smart Cards" (Symposium on Applied Computing, Proceedings of the 2002 ACM Symposium on Applied Computing, Madrid, Spain, ISBN 1-58113-445-2, pages 214 to 220; by Chenghuai Lu, Andre L. M. dos Santos, and Francisco R. Pimentel, describes the issues and considerations that need to be taken into account when implementing the key generation step of a cryptographic algorithm widely used nowadays, Rivest, Shamir, and Adleman (RSA).

In this article, two simple but efficient key generation algorithms are evaluated, in addition to a simple but not very efficient algorithm. The article discusses how to build fast implementations for the three algorithms presented, using smart cards with crypto-coprocessor.

To summarize, with chip cards or smart cards becoming more powerful, public key based cryptography becomes more and more important. At the moment, the R[ivest-]S[hamir-]A[dleman] system is the de facto standard regarding such cryptography.

Partly as a result for more security, partly for convenience reasons chip cards or smart cards need to compute their own keys. The computation of a R[ivest-]S[hamir-]A[dleman] key is quite resource intensive, both in terms of software footprint, as well as in terms of computation time.

Therefore, there is very much interest in ways to reduce the intensity of resources. If it is possible to use hardware inversion then this will greatly decrease the amount of software required to be written, thus cutting down on the time.

Starting from the disadvantages and shortcomings as described above, in particular starting from the fact that some inverters only allow inversion modulo an odd number, and taking the prior art as discussed into account, an object of the present invention is to further develop a circuit arrangement of the kind as described in the technical field as well as a method of the kind as described in the technical field in order to enable inversion modulo an even number.

The object of the present invention is achieved by a circuit arrangement comprising the features of claim 1 as well as by a method comprising the features of claim 5. Advantageous embodiments and expedient improvements of the present invention are disclosed in the respective dependent claims.

The present invention is principally based on the idea of utilizing odd-only inversion hardware also for even numbers, i.e. of utilizing at least one modular invertor allowing only odd numbers also for even numbers. With the R[ivest-]S[hamir-]A[dleman] key generation being the primary public key algorithm, the teaching of the present invention enables inversion also modulo an even number, thus extending (prior art) inversion for RSA key generation modulo odd numbers to (new) inversion for RSA key generation modulo even numbers.

The present invention describes how the inverter can be used to also invert modulo an even number thereby speeding up computing keys for RSA cryptographic algorithm. According to a preferred embodiment, the present invention works by performing a series of arithmetical steps which involve an inversion modulo an odd number. The algorithm is designed in such way that the end result is equal to what more powerful hardware could have produced.

The present invention further relates to a microcontroller, in particular to an embedded security controller, including at least one circuit arrangement, in particular at least one integrated circuit, such as at least one mathematical coprocessor, of the above-described type. Accordingly, the above-described method can preferably be incorporated, for example, in all chipcard or smartcard developments.

The present invention further relates to a data processing device, in particular to an embedded system, for example to a chip card or to a smart card, comprising at least one circuit arrangement, in particular at least one integrated circuit, such as at least one mathematical coprocessor, of the above-described type, carrying out the cryptographic calculation.

The present invention further relates to a computer program product directly loadable into the memory of at least one computer, comprising at least one software code portion for performing the method of the above-described type when said computer program product is run on the computer.

The present invention further relates to the electronic distribution of at least one computer program product of the above-described type.

The present invention finally relates to the use of at least one circuit arrangement, in particular of at least one integrated circuit, such as of at least one mathematical coprocessor, of the above-described type and/or of the method of the above-described type in at least one data processing device, in particular in at least one embedded system, for example in at least one chip card or a smart card, of the above-described type in the field of public key cryptography, such as banking, online shopping, security, etc.

The light weight of the algorithm make it especially suited to restricted environments, such as chip cards or smart cards.

As already discussed above, there are several options to embody as well as to improve the teaching of the present invention in an advantageous manner. To this aim, reference is made to the claims respectively dependent on claim 1 and on claim 5; further improvements, features and advantages of the present invention are explained below in more detail with reference to a preferred embodiment by way of example and to the accompanying drawings where FIG. 1 schematically shows a block diagram of an embodiment of a data processing device comprising a circuit arrangement according to the present invention by means of which the method according to the present invention can be carried out.

The embodiment of a data processing device 100, namely an embedded system in the form of a chip card or of a smart card comprising an I[ntegrated]C[ircuit] carrying out cryptographic operations refers to a P[ublic]K[ey]I[nfrastructure] system and works according to the method of the present invention.

Starting from the fact that some hardware inverter for the Galois Field GF (p) or GF($2^n$) only allow inversion modulo odd numbers, and taking into account that recent chip cards or smart cards also have this property making the hardware unsuitable for R[ivest-]S[hamir-]A[dleman] key generation, the present invention makes it possible to expand this hardware to that field by performing arithmetical steps calculating the RSA generated decryption exponent d of a private key having an even number modulo by hardware inverters only allowing inversion modulo odd numbers. In this context, a notation can be used such as that for RSA key generation:

Let phi be the Euler totient function of the prime numbers p and q, i.e. phi=(p−1).(q−1); in this context, it may be noted that phi is always even. Let e be the chosen encryption exponent; due to the workings of the RSA algorithm this number e must always be odd.

The finding of the number d, i.e. of the decryption exponent, can be computed by solving the equation d=$e^{-1}$ mod (phi); in other words, d is the inverse of e modulo phi. Hence, to compute d an inverse must be taken modulo an even number.

To work around this problem, the following steps are performed:
(i) compute a=$phi^{-1}$ mod(e);
(ii) compute y=(a.$phi^{-1}$)/e;
(iii) reduce y mod(e); and
(iv) set d=phi−y.

It can be mathematically proven that this will give the correct result. Moreover it can also be proven that no negative number will be needed. Also upper bounds can be computed for the intermediate results.

Finally, FIG. 1 shows a block diagram of a hardware implementation of a data processing device, namely of a smart card 100 comprising a circuit arrangement according to the present invention by means of which the method according to the present invention can be carried out.

The smart card 100 comprises the following components:
a microcontroller 10 for general control to communicate with the outside world via an interface 12, for example according to ISO-7816-3 standard; the microcontroller 10 sets pointers for data in R[andom]A[ccess]M[emory]/R[ead]O[nly]M[emory] and starts the coprocessor 20;
a R[ead]O[nly]M[emory] 30 for the program of the microcontroller 10;

a P[rogrammable]R[ead]O[nly]M[emory] (flash memory or E[lectrically]E[rasable]P[rogrammable]R[ead]O[nly]M[emory]) 40 for the non-volatile storage of data and/or of programs;

a R[andom]A[ccess]M[emory] 50 for the volatile storage of data, for instance for the storage of intermediate results during calculations; and a coprocessor 20 dedicated to perform special high-speed tasks for E[lliptic]C[urve]C[ryptography] calculations, in particular for E[lliptic]C[urve]D[igital]S[ignature]A[lgorithm] calculations, or for R[ivest-]S[hamir-]A[dleman] calculations.

When a task is ready, control is returned to the microcontroller 10.

In a variant, the present invention is implemented in software with at least one microprocessor A[rithmetic]L[ogical]U[nit] to provide add operations, subtract operations, and/or shift operations with programming of the controller to provide control logic, and degree detection by shift registers.

LIST OF REFERENCE NUMERALS

100 data processing device, in particular embedded system, for example chip card or smart card
10 microcontroller unit
12 interface unit of microcontroller unit 12
20 coprocessor unit
30 R[ead]O[nly]M[emory] unit
40 P[rogrammable]R[ead]O[nly]M[emory], in particular flash memory or E[lectrically]E[rasable]P[rogrammable]R[ead]O[nly]M[emory]
50 R[andom]A[ccess]M[emory]

The invention claimed is.

1. A method of calculating a cryptographic key using a mathematical coprocessor, the method comprising:
    calculating a first value $a = phi^{-1} \bmod(e)$, with $phi = (p-1)(q-1)$ with p and q being prime numbers and e being a chosen encryption exponent and an odd number;
    calculating a second value $y = (a.phi^{-1})/e$;
    reducing the second value y mod(e);
    calculating a decryption exponent $d = phi - y$; and
    wherein the mathematical coprocessor is configured only for calculating an inversion modulo the odd number.
2. The method of claim 1, further comprising:
    using the method of calculating in a Rivest Shamir Adleman (RSA) cryptographic algorithm.
3. The method of claim 1, further comprising:
    using the method of calculating in an Elliptic Curve Cryptography (ECC) calculation.
4. The method of claim 1, further comprising:
    using the method of calculating in an Elliptic Curve Digital Signature Algorithm (ECDSA).
5. The method of claim 1, wherein the mathematical coprocessor is coupled to an embedded security controller.
6. The method of claim 5, wherein the embedded security controller further comprises a chip card.
7. The method of claim 5, wherein the embedded security controller further comprises a smart card.
8. A non-transitory computer readable storage medium embodied there on a computer program, wherein the computer program is executed on a mathematical coprocessor configured only for calculating an inversion modulo an odd number, the program comprising:
    instructions for calculating a first value $a = phi^{-1} \bmod(e)$, with $phi = (p-1)(q-1)$ with p and q being prime numbers and e being a chosen encryption exponent and an odd number;
    instructions for calculating a second value $y = (a.phi^{-1})/e$;
    instructions for reducing the second value y mod(e);
    instructions for calculating a decryption exponent $d = phi - y$.
9. The computer program of claim 8, further comprising:
    instructions for using the method of calculating in a Rivest Shamir Adleman (RSA) cryptographic algorithm.
10. The computer program of claim 8, further comprising:
    instructions for using the method of calculating in an Elliptic Curve Cryptography (ECC) calculation.
11. The computer program of claim 8, further comprising:
    instructions for using the method of calculating in an Elliptic Curve Digital Signature Algorithm (ECDSA).
12. The computer program of claim 8, wherein the mathematical coprocessor is coupled to an embedded security controller.
13. The computer program of claim 8, wherein the embedded security controller further comprises a chip card.
14. The computer program of claim 8, wherein the embedded security controller further comprises a smart card.
15. A smart card, the smart card comprising:
    a microcontroller;
    a plurality of memory units; and
    a coprocessor configured only for calculating an inversion modulo an odd number, wherein the coprocessor calculates:
    a first value $a = phi^{-1} \bmod(e)$, with $phi = (p-1)(q-1)$ with p and q being prime numbers and e being a chosen encryption exponent and an odd number;
    a second value $y = (a.phi^{-1})/e$;
    the second value y mod(e);
    a decryption exponent $d = phi - y$.

* * * * *